US007297942B2

(12) United States Patent
Holle et al.

(10) Patent No.: US 7,297,942 B2
(45) Date of Patent: Nov. 20, 2007

(54) METHOD AND DEVICE FOR CLEANING DESORPTION ION SOURCES

(75) Inventors: Armin Holle, Oyten (DE); Jochen Franzen, Bremen (DE)

(73) Assignee: Bruker Daltonik, GmbH, Bremen (DE)

( * ) Notice: Subject to any disclaimer, the term of this patent is extended or adjusted under 35 U.S.C. 154(b) by 730 days.

(21) Appl. No.: 10/757,686

(22) Filed: Jan. 14, 2004

(65) Prior Publication Data

US 2004/0163673 A1 Aug. 26, 2004

(30) Foreign Application Priority Data

Jan. 15, 2003 (DE) ............................... 103 01 200
Apr. 11, 2003 (DE) ............................... 103 16 655

(51) Int. Cl.
*B01D 59/44* (2006.01)

(52) U.S. Cl. ...................................... 250/288; 436/174

(58) Field of Classification Search .................... None
See application file for complete search history.

(56) References Cited

U.S. PATENT DOCUMENTS 5,498,545 A * 3/1996 Vestal ......................... 436/47
5,841,136 A * 11/1998 Holle et al. ................. 250/288
6,071,610 A * 6/2000 Jarrell et al. ................ 428/335
6,414,306 B1 7/2002 Mayer-Posner et al.
6,822,230 B2 * 11/2004 Schleifer et al. ............ 250/288
6,825,478 B1 * 11/2004 McCarthy et al. ..... 250/440.11

FOREIGN PATENT DOCUMENTS

GB 2 317 049 A 3/1998

OTHER PUBLICATIONS

Donegan et al. "Controlling Matrix suppression for matrix-assisted laser desorption/ionization analysis of small molecules", Rapid Communicaitons in Mass Spectrometry, 2004; 18: 1885-1888.*

* cited by examiner

*Primary Examiner*—David Vanore
(74) *Attorney, Agent, or Firm*—The Law Offices of Paul E. Kudirka

(57) ABSTRACT

The invention relates to the cleaning of contaminated accelerating or guiding electrodes of ion sources used for ion generation by desorption. A cleaning plate is used that has an outer contour similar to that of a standard sample support plate, and may be equipped with cleaning scrubbers that can be moved out when necessary to contact the electrodes. The scrubbers may include soft covers, and can carry out the cleaning by dry rubbing or with the help of high-boiling solvents for the matrix substances. The moving out of the cleaning scrubbers can be controlled by external light pulses from a laser or video camera spot light. Alternatively, the cleaning plate may be equipped with spray nozzles connected to a reservoir of cleaning fluid which is sprayed onto the electrodes, and the evacuation of the ventilated ion source chamber may be used to initiate the spraying.

28 Claims, 2 Drawing Sheets

METHOD AND DEVICE FOR CLEANING DESORPTION ION SOURCES

FIELD OF THE INVENTION

The invention relates to the cleaning of ion sources for ion generation by desorption, in particular by matrix-assisted laser desorption.

BACKGROUND OF THE INVENTION

Desorption ion sources, especially ion sources for the ionization of samples by matrix-assisted laser desorption (MALDI), are increasingly being used for the ionization of large molecules, for example large biomolecules or artificial polymers. Ever increasing sample throughput is required.

In MALDI ion sources, bombardment with a pulse of laser light generates a plasma cloud each time, from which the ions formed are then extracted by means of an accelerating field. The plasma cloud also partially contains solid or liquid spray particles from the quasi-explosion of the matrix material. The plasma cloud expands further, depositing part of the material, matrix substance and analyte substance vaporized or sprayed in this way on the accelerating electrodes, mainly on the first acceleration electrode. As an alternative to the accelerating electrode, this type of desorption ion source can also incorporate a set of guide electrodes. After a few hundred thousand shots, there is a visible coating on these electrodes. This insulating coating can become charged and thus lead to interference of the acceleration process. The coating must therefore be removed.

The only method known until now for removing this coating is manual cleaning after venting and opening the ion source. The cleaning is usually carried out using solvents such as ethanol or acetone, and can usually be done without removing the accelerating electrode. But even without disassembling the ion source, cleaning, including the restoration of a good vacuum, takes a few hours and often requires a new adjustment and usually a completely new calibration after the mass spectrometer has been restarted.

In the following, the accelerating electrodes and the set of ion guide electrodes which are present in a desorption ion source in analytic operation (i.e. not during the cleaning operation) opposite the sample support plate are referred to collectively as “ion guide electrodes”.

A method of cleaning, in particular, of the first accelerating electrode without opening the ion source is indispensable for genuinely high throughput operation; accelerating electrodes which are usually further away remain uncontaminated for a longer time. For sustained operation, however, it is also necessary to clean the more distant accelerating electrodes.

The ion source usually also contains a video camera and a spot light to identify the samples on the carriers.

SUMMARY OF THE INVENTION

The invention involves a method and device for cleaning contaminated electrodes of a mass spectrometer. The electrodes are used for accelerating or guiding the ions in the ion source, and are cleaned using a special cleaning plate having a shape and outline like that of a typical sample support plate for that spectrometer. This cleaning plate can thus be introduced into the vacuum system of the ion source of the mass spectrometer via the sample support lock without opening the ion source. The cleaning plate can be equipped with cleaning scrubbers that may be moved out when necessary and that can carry out the cleaning by dry rubbing or with the help of high-boiling point solvents for the matrix substances. The moving out of the cleaning scrubbers can be controlled with a remote method, for example by triggering a photosensitive component on the plate using a coded sequence of pulses from an external laser. In another embodiment, the cleaning plate can also be equipped with spray nozzles connected to a reservoir of cleaning fluid that are used to spray the fluid onto the surface of the electrodes. In this embodiment, evacuation of the vented ion source chamber may be used to effect the spraying.

In the cleaning scrubber embodiment, the cleaning plate incorporates one or more cleaning scrubbers to clean a flat ion guide electrode, for example the first accelerating electrode, using the x-y movement mechanism for the support plate to move the scrubbers. If the design of the ion source so allows, the cleaning scrubbers can protrude so far that it is possible to clean without moving out the cleaning scrubbers further; but they can also be recess mounted and able to be moved out for cleaning. Since most ion sources and sample support locks cannot accommodate cleaning scrubbers which keep protruding, it may be advantageous to allow that the cleaning scrubbers can be moved out.

The cleaning scrubbers have a soft cover made of fabric, felt, leather, sponge, steel wool, emery wool or brush hairs. The covers can be soaked in a liquid with a high boiling point, such as glycerin, which can dissolve the material adhering to the accelerating electrodes.

Where necessary, the cleaning scrubbers can be moved out of the cleaning support plates by battery-driven electromechanical devices such as relays or motors. All of these devices, including the battery, are incorporated in the cleaning plate and are vacuum proof. Light-sensitive elements on the cleaning plate can be used to control the moving out of the cleaning scrubbers by means of a laser shot or a coded series of laser shots. Another option is to effect the control using coded pulses of light from the spot light of a video camera used to view the spectrometer. Electronic time switching, for example, can be used to move out the cleaning scrubber with a delay, leaving time to position the scrubber directly in front of the contaminated center of the accelerating electrode. The electronic time switching can also ensure that the cleaning scrubber is retracted again after a preset time.

In another embodiment, the cleaning plate incorporates one or more spray nozzles connected to a reservoir of cleaning fluid in the inside of the cleaning plate. Ethyl alcohol or acetone can be used as cleaning fluid, for example; for a nozzle diameter of around 50 to 300 micrometers, favorably about 100 micrometers, five to ten milliliters of fluid is sufficient for a cleaning time of around ten to twenty seconds. This cleaning plate with spray nozzles is introduced via the lock into the vented ion source chamber. It begins spraying in the form of a fine, needle sharp jet after the beginning of an evacuation of the ion source chamber with the help of the vacuum forepump. A rotating or meandering motion of the cleaning plate brought about by the movement device of the sample support plates effects cleaning in a few seconds. In the case of flat accelerating electrodes, the jet can also reach the second accelerating electrode via holes in the first accelerating electrode and clean this as well.

As is the case with the sample support plates, both types of cleaning plates can be equipped with a machine readable identification code, in a transponder or as a barcode, for example. The encoded information can be read by the mass spectrometer during introduction and used to automatically call up a control program for the cleaning procedure which suits the cleaning plate version currently being used or meets the analytical requirements of the sample preparation being used at that time. In this way, cleaning plates can be stacked together with normal sample support plates and automatically fed into the mass spectrometer by feed robots as part of a series of sample support plates. In critical cases, cleaning of the accelerating plates of the ion source can thus be carried out after the analysis of a predetermined number of sample support plates (which each contain 384 or 1536 samples, for example).

A method for cleaning a flat accelerating electrode with scrubbers can proceed as follows: First of all the cleaning plate is introduced via the vacuum lock into the vacuum chamber of the ion source of the mass spectrometer, thereby reading the identification code, and the cleaning plate is positioned in front of the accelerating electrode. A cleaning scrubber is then moved out of the cleaning plate is such a way that it softly presses against the accelerating electrode. As a result of the x-y movement mechanism for the sample support plate, the cleaning plate is moved in such a way that the accelerating electrode is cleaned of the material adhering to it. The movement of the x-y stage is controlled by a computer program for the cleaning process.

A dampened cleaning scrubber can be used for the cleaning, for example, but a dry cleaning scrubber is also effective, especially when emery is incorporated into it. After cleaning with a damp scrubber, the electrode can be polished with a dry one; brushes can be used to remove dirt from the internal edges of the ion optical apertures. Finally, the cleaning scrubber used last is retracted again and the cleaning plate is removed via the lock. In this way, all of the dirt is removed via the lock and it is then easy to clean the cleaning scrubbers and prepare them for a new cleaning process.

One of the cleaning scrubbers can be soaked in a high-boiling liquid before the cleaning plate is introduced via the lock to make it easier to remove the material adhering to the accelerating electrode. Glycerin can be used as a cleaning fluid, for example. Glycerin is a trivalent alcohol which does not begin to boil even under vacuum conditions. Other high-boiling liquids can also be used here, for example vacuum pump oil. The type of liquid depends to a great extent on the type of contamination which, in turn, consists mainly of the matrix material for the MALDI ionization, as a rule.

The cleaning method is different when a cleaning plate with spray nozzles is used, as has been briefly described above, since, in this case, the ion source chamber must be vented.

Both types of cleaning plate can also incorporate one or more mirrors which enable the cleaning success to be checked by the naked eye or by video camera. In particular, several mirrors at several different angles can be mounted in order to see different parts of the acceleration aperture. The cleanness can be checked visually or automatically by means of image processing programs.

BRIEF DESCRIPTION OF THE DRAWINGS

The above and further advantages of the invention may be better understood by referring to the following description in conjunction with the accompanying drawings in which.

DETAILED DESCRIPTION

Figure 1:
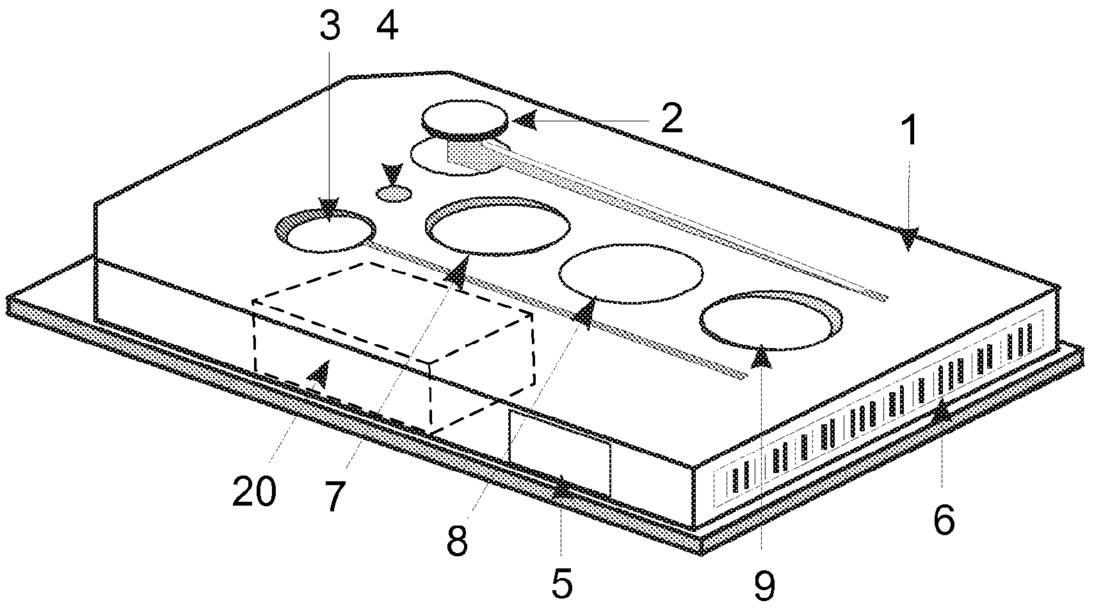
FIG. 1 shows schematically a first cleaning plate according to the invention.

The invention relates to both devices and methods for cleaning ion guide electrodes in a laser desorption ion source. In one embodiment, shown in FIG. 1, the main body (1) of a cleaning plate, shown here with the outline of a microtitre plate, has recessed cleaning scrubbers (2) and (3) with covers. In this figure, the cleaning scrubber (2) is shown having been moved out of its recess, while the scrubber (3) remains in its recess. The moving out can be started by laser bombardment onto a light sensitive element (4), which is electrically connected to a circuit that effects movement of the scrubbers. The cleaning plate here carries both a transponder (5) and a barcode (6) mounted on the front end. The mirrors (7, 8, 9) inset at different angles make it possible to check on the cleaning success with the video system of the mass spectrometer (not shown). This type of device may be used when the ion guide electrodes to be cleaned are the first of the flat accelerating electrodes.

For the invention, it is favorable if the sample support plate is neither too small nor too thin. The cleaning plate has an outer contour similar to that of a standard sample support plate, such as a microtitre plate, intended for the spectrometer to be cleaned. As such, it can be introduced into the vacuum system of the ion source of the mass spectrometer via a conventional sample support lock. A plate the size of a microtitre plate also has sufficient room to accommodate the cleaning scrubbers and other necessary components.

In order to be able to move the cleaning scrubbers out of their respective recesses, the cleaning plate incorporates a controller (20), which includes electrical and electromechanical devices such as a vacuum proof battery, control electronics, relays or electric motors. Light sensitive elements of the control electronics on the outside of the cleaning plate can react to laser bombardment or to the video spot light of a video camera. This can be used to control the moving out of the cleaning scrubbers to suit the prevailing situation. In each case, the cleaning scrubbers are moved out so far as to softly press on the accelerating electrode. A spring may also be used with the controller and can generate a uniform pressure of the desired strength.

Each cleaning scrubber carries a cover which can be made of an elastic or soft porous or otherwise flexible material. The covers can be made of paper, fabric, felt, leather, steel wool, rubber or sponge, or they can be in the form of a brush. Coarse or fine emery particles can also be embedded into the cover material. The surface of this cover is used with a scrubbing action to clean the accelerating electrode. The cover material of a cleaning scrubber can be soaked in a high-boiling liquid before the cleaning plate is introduced via the lock, the high-boiling liquid chosen being able to dissolve the material adhering to the accelerating electrode, which consists mainly of matrix substance. Polyvalent alcohols such as glycerin or glycol, or liquids such as diffusion pump oils (polyethylene glycol) are suitable liquids for this purpose. Ether bonds in the polyvalent alcohols create liquids which remain in the liquid state in spite of their low vapor pressure. It is advantageous if these liquids develop enough residual pressure so that a thin residual film remaining after wiping with a dry material dries within a few tens of minutes. After cleaning with a liquid, it is favorable to wipe and polish the accelerating electrode with a dry absorbent cleaning scrubber, covered, for example, with velvet.

Figure 2:
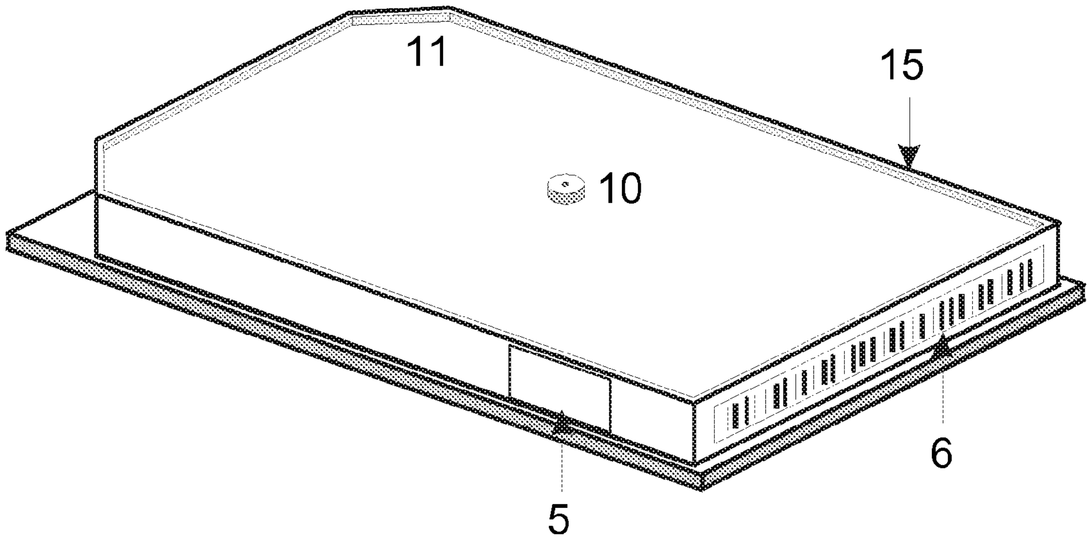
FIG. 2 shows schematically a cleaning plate having a central spray nozzle via which cleaning solution may be sprayed onto the ion guide electrodes.

In another embodiment, shown in FIG. 2, the cleaning plate incorporates one or more spray nozzles. In this embodiment, the cleaning plate (15) has a central spray nozzle (10) lying in a catch basin (11) in order to catch the cleaning fluid which drips down when vertical spraying is employed. This type of cleaning plate can be used with ion guide electrodes which are not necessarily flat in shape; it can also especially be used to clean a second, flat accelerating electrode. The spray nozzles are equipped with one or more tubes or pipes dipping into a reservoir of cleaning fluid inside the cleaning plate. The reservoir is typically only partly filled in order to create an air cushion within the reservoir. Ethyl alcohol or acetone, for example, are suitable cleaning fluids, depending on the matrix substance, but other organic solvents can also be used. Nozzle diameters of 50 to 400 micrometers may be used. For a nozzle diameter of around 100 micrometers, five milliliters of fluid in ten milliliters reservoir volume is sufficient for a cleaning time of about twenty seconds.

Like the plate of FIG. 1, it is desirable to have the cleaning plate (15) be of an outer contour similar to that of a standard sample support plate, so that it may be introduced via the lock into the vented ion source chamber. It begins the spraying in the form of a fine, defined jet after the beginning of the evacuation of the ion source chamber by the spectrometer's forepump. Very rapid cleaning is achieved by using the x-y movement device of the sample support plate to move the cleaning plate in a circulating, meandering or other movement which provides all-over cover. In the case of flat accelerating electrodes, the jet can also reach the second accelerating electrode via holes in the first accelerating electrode in order to clean this one as well. Experience has shown that the thin coating layers dissolve in seconds and drop with the cleaning fluid into lower, uncritical regions of the ion source chamber. In the case of vertical spraying, the cleaning fluids drop back onto the cleaning plate. They vaporize completely within a few minutes because of the effect of the evacuation.

When the phrase "vented ion source chamber" is used herein, it can mean that only the ion source chamber is vented if this can be closed off from the rest of the mass spectrometer by means of a valve. It can, however, also mean that the mass spectrometer in its entirety, or large parts thereof, has to be vented, if there is no such valve between the ion source chamber and the rest of the mass spectrometer. The venting must naturally include the ion source chamber.

Figure 3A:
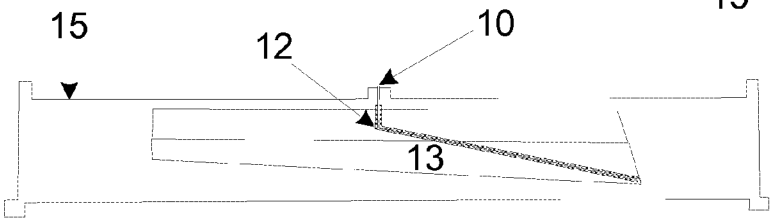
FIGS. 3A and 3B show two schematic cross sections through a cleaning plate like that of FIG. 2, one oriented for vertical spraying and the other oriented for horizontal spraying.
Figure 3B:
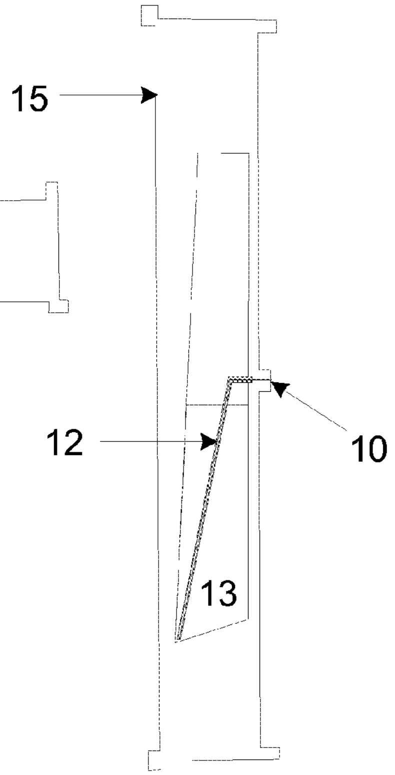

FIGS. 3A and 3B show two schematic cross sections through the cleaning plate (15) with spray nozzle (10), one oriented for vertical spraying and the other oriented for horizontal spraying. In both figures, the spray nozzle (10) has a tube (12) or a pipe which dips into the cleaning fluid (13), which only partially fills the reservoir volume in order to create an air cushion at atmospheric pressure. This air cushion presses the fluid out of the spray nozzle during evacuation. The form of the reservoir is such that the cleaning plate can be used to spray vertically and horizontally.

Each of the cleaning plates (1) and (15), shown in FIGS. 1 and 2 respectively, can incorporate a machine readable identification code. This may be accomplished using, for example, a built-in transponder or a barcode printed on the plate, similar to techniques used for normal sample supports. It is then possible to read the information contained in the code in a reading station of the mass spectrometer. On the basis of this information, the control program of the mass spectrometer can then call up and execute a special cleaning control program. Each type of cleaning plate can also incorporate one or more movable or immovable mirrors which can be used to check on the cleaning by means of the video system of the mass spectrometer.

The method of cleaning the accelerating electrode with scrubbers involves introducing the cleaning plate in the same way that a normal sample support plate would be introduced, i.e., through the lock into the evacuated vacuum chamber of the ion source of a mass spectrometer. The cleaning plate is then positioned in front of the accelerating electrode, and one of the cleaning scrubbers from the cleaning plate is moved against the accelerating electrode. Using the x-y movement mechanism of the sample support plate to move the cleaning plate together with the cleaning scrubber, the accelerating electrode is cleaned of the material adhering to it. Finally, the cleaning scrubber used last is retracted and the cleaning plate is removed via the lock.

This method can be extended so that the cleaning is carried out first of all using a damp scrubber, then a dry one. Or it can initially be rubbed with coarse emery, then wiped with a damp material before being dried with a soft material. It is preferable if the wiping is done using the x-y movement device which is already available to position the samples on the sample support plate. It is, however, also possible to let the extended cleaning scrubber move on its own, for example by rotating a brush-shaped cleaning scrubber. A combination of movement of the cleaning scrubber with the movement of the x-y stage is also possible.

Figure 4:
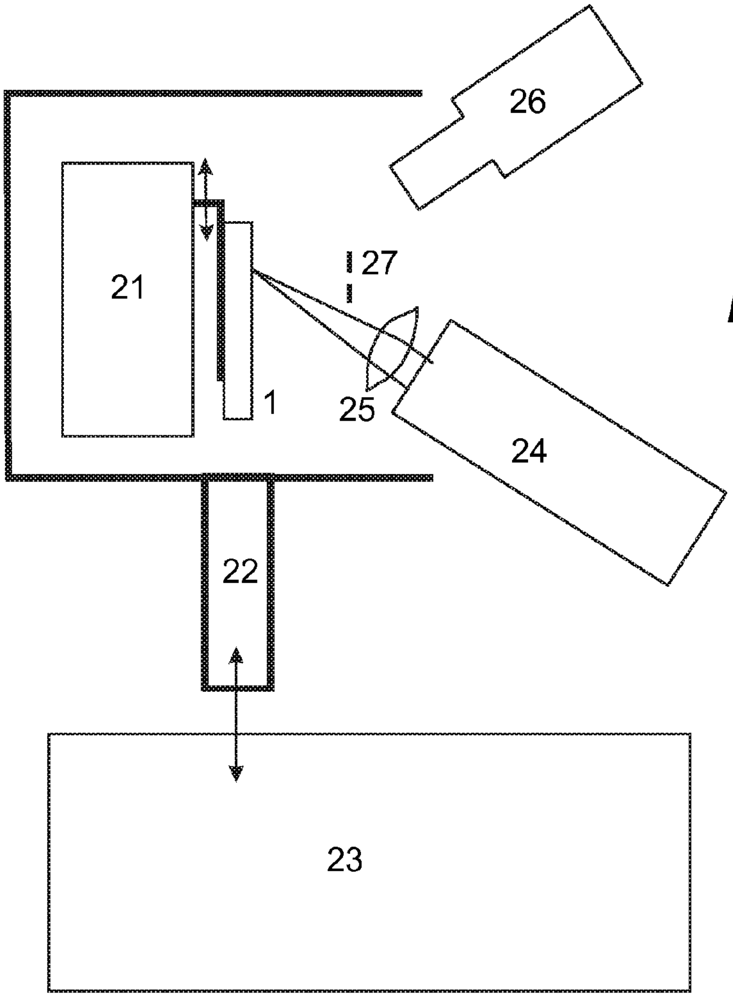
FIG. 4 shows a schematic view of some of the components of a typical spectrometer arranged to make use of a cleaning plate according to the present invention.

FIG. 4 is a schematic depiction of some of the components of a typical spectrometer arranged to make use of a cleaning plate. In this figure, a feeding robot (23) is shown that is used to feed the cleaning plate (1) into the ion source chamber via vacuum lock (22). In the chamber, the plate is secured to movement device (21), and may be moved adjacent to ion guide electrode (27), which the electrode may be reached with the cleaning plate scrubbers. A pulse laser (24) with focusing lens 25 allows the delivery of light pulses to the cleaning plate, and video camera 26 is also present and focused on the cleaning plate position.

The cleaning procedure is controlled by a cleaning control program located in a control computer of the mass spectrometer. This can be started manually by the user of the mass spectrometer. It can also be started automatically, for example via the information in a transponder incorporated into the cleaning plate which can be read by a reading station of the mass spectrometer. It is thus possible to stack the cleaning plates together with normal sample support plates and to have them automatically fed into the mass spectrometer by feed robots as part of a series of sample support plates. After analyzing a given number of sample support plates (which each may contain 384 or 1536 samples, for example) the first accelerating plate of the ion source can automatically be cleaned, for example in high throughput analysis runs of many ten thousands of samples which are carried out over a weekend.

When using a cleaning plate like that shown in FIG. 1, the cleaning scrubber can be moved out using an electronic time control, for which a one off initialization is necessary and this can be done by introducing it into the vacuum chamber, for example. It can also be initiated by a mechanical contact which can be triggered by the x-y movement unit for the support plate, for example, by hitting a fixed protrusion on the wall of the vacuum chamber. It is useful, however, to have more flexible control of the cleaning procedure by means of a contact-free signal transmission to the cleaning support plate. A very simple method of signal transmission can be provided by a coded series of laser shots onto a light sensitive element of the cleaning plate, for example. In this way, certain cleaning steps can be repeated again and again as required by the samples and the situation. A coded switching on and off of the video spot light can also be used.

In this situation, a signal from one or more laser shots via the light sensitive element can cause the immediate or delayed moving out of one of the cleaning scrubbers. It is useful if the retraction is carried out automatically after a preset period of time to ensure that, whatever happens, the cleaning plate can be removed from the mass spectrometer via the lock again.

Before the cleaning plate is removed via the lock, the cleaning procedure can be checked. The checking can be done simply from the outside by using windows; it is particularly favorable to use the video equipment of the mass spectrometer, however. For this purpose, mirrors can be inserted into the cleaning plate, said mirrors being inclined at such an angle that they reflect the critical parts of the accelerating electrode. As a rule, the slightly extended object distance of the video optics still provides images which are sharp enough to assess the cleanliness. The mirrors can also improve the imaging characteristics by use of an appropriate curvature. It is also possible to move out the mirrors from the surface of the cleaning plate, in a similar way to that used for the cleaning scrubbers, in order to produce an optimum viewing distance of the video camera which normally is focused onto the samples on the sample support plate.

When using a cleaning plate like that shown in FIG. 2, the method of operation is somewhat different: In this case, the vacuum lock is not evacuated for introducing the plate but, instead, the ion source chamber is vented (for example with dry nitrogen). The machine-readable code on the cleaning support plate must therefore be read before the vacuum lock is evacuated. The cleaning plate is then introduced via the lock into the vented ion source chamber and positioned in front of the ion guide electrodes. Only then is the forepump for evacuating the ion source chamber switched on and, after a short time, a needle sharp fine jet of cleaning fluid shoots out of the spray nozzle (or nozzles if two or more spray nozzles are present). The cleaning plate is now set into a circular or meandering motion in order to clean the ion guide electrodes. The cleaning is done within a few seconds using ethyl alcohol or acetone.

The cleaning fluid initially drops from the ion guide electrodes but quickly begins to vaporize because of the low pressure. The vapors of the cleaning fluid are also pumped away by the forepump. Experience has shown that the vapors are not harmful to the forepump, on the contrary, they seem to clean the forepump oil.

In the case of manually started cleaning, the checking can be done visually by the operator examining the image on the screen. It is also possible, however, to have automatic checking carried out by an image evaluation program. It is then particularly possible to document the cleaning using pictures.

What is claimed is:

1. Cleaning plate for cleaning the ion guide electrodes of a mass spectrometer having a vacuum lock for the introduction of a sample support plate and a desorption ion source in which the ion guides reside adjacent to a sample support plate that has been introduced through the vacuum lock, the cleaning plate comprising:

an outer contour sufficiently similar to that of the sample support plate that the cleaning plate can be introduced into the vacuum system of the mass spectrometer via the vacuum lock; and a cleaning device that resides adjacent to the ion guide electrodes when the cleaning plate is introduced to the mass spectrometer and with which the ion guide electrodes may be cleaned.

2. Cleaning plate according to claim 1, wherein the cleaning device comprises one or more cleaning scrubbers.

3. Cleaning plate according to claim 2, wherein the cleaning scrubbers each have a cover made of fabric, felt, leather, steel wool, rubber, sponge or brush hairs.

4. Cleaning plate according to claim 3, wherein the material of the cover contains emery particles.

5. Cleaning plate according to claim 2, wherein the cleaning scrubbers are recess mounted in the cleaning plate and the cleaning plate incorporates electromechanical devices with which the cleaning scrubbers can be moved out of their recesses.

6. Cleaning plate according to claim 5, further comprising light sensitive elements that can respond to light signals to initiate the movement of the cleaning scrubbers.

7. Cleaning plate according to claim 1, wherein the cleaning device comprises at least one spray nozzle which is connected to a fluid volume in the cleaning plate.

8. Cleaning plate according to claim 7, wherein each spray nozzle has an inside diameter of between 50 and 300 micrometers.

9. Cleaning plate according to claim 1, further comprising an identification element that identifies it as a cleaning plate.

10. Cleaning plate according to claim 9, wherein the identification element comprises a machine readable code.

11. Cleaning plate according to claim 10, wherein the machine readable code is coded in a transponder attached to the cleaning plate.

12. Cleaning plate according to claim 10, wherein the machine readable code comprises a barcode attached to the cleaning plate.

13. Cleaning plate according to claim 1, wherein the cleaning plate incorporates one or more mirrors that allow optical checking of the cleaning success.

14. Method for cleaning an ion guide electrode in an ion source chamber of a mass spectrometer with a sample support vacuum lock, the method comprising:

(a) introducing a cleaning plate with one or more spray nozzles connected to cleaning fluid into the vacuum lock;

(b) venting the ion source chamber of the mass spectrometer without evacuating the sample support lock;

(c) moving the cleaning plate into the vented ion source chamber and positioning the cleaning plate in front of the ion guide electrode;

(d) evacuating the ion source chamber whereby the cleaning fluid begins to spray out of the spray nozzles; and (e) moving the cleaning plate in such a way that fluid from the spray nozzles is incident upon predetermined areas of the ion guide electrode.

15. Method according to claim 14, wherein moving the cleaning plate comprises moving the cleaning plate with a movement mechanism used for movement of a typical sample support plate used with the spectrometer.

16. Method according to claim 14, wherein the cleaning plate is stored together with normal sample support plates and the method further comprises automatically feeding the cleaning plate to the mass spectrometer by means of a feed robot.

17. Method according to claim 14 wherein the cleaning plate includes mirrors attached to its surface, and wherein the method further comprises observing cleaning progress optically using the mirrors.

18. Method for cleaning an ion guide electrode in a desorption ion source of a mass spectrometer with a sample support vacuum lock, the method comprising:

(a) introducing a cleaning plate with one or more cleaning scrubbers into a vacuum chamber of the ion source via the vacuum lock;

(b) positioning the cleaning plate in front of the ion guide electrode;

(c) moving a cleaning scrubber out of the cleaning plate in such a way that a scrubber surface presses against the ion guide electrode; and (d) moving the cleaning scrubber in such a way that material adhering to the ion guide electrode is removed by the cleaning scrubber.

19. Method according to claim 18 wherein moving the cleaning plate comprises moving the cleaning plate with a movement mechanism used for movement of a typical sample support plate used with the spectrometer.

20. Method according to claim 18 wherein at least one of the cleaning scrubbers has a soft cover material that contacts the electrode.

21. Method according to claim 20 wherein the soft cover of at least one of the cleaning scrubbers is dampened with a high-boiling point liquid before the cleaning plate is introduced via the lock.

22. Method according to claim 21, wherein after cleaning with a dampened cleaning scrubber polishing is carried out with a dry cleaning scrubber.

23. Method according to claim 18, wherein the cleaning plate comprises a light sensitive element connected to a controller for the scrubbers, and wherein a light signal is directed at the light sensitive element to initiate movement of one of the cleaning scrubbers.

24. Method according to claim 18, wherein the cleaning scrubbers are automatically retracted again after a preset time.

25. Method according to claim 18, wherein the cleaning plate comprises a machine readable identification element that may be read in a reading station of the mass spectrometer, and wherein reading of the identification element may be used to initiate a control program for the cleaning.

26. Method according to claim 18, wherein the cleaning plate is stored together with normal sample support plates and the method further comprises automatically feeding the cleaning plate to the mass spectrometer by means of a feed robot.

27. Method according to claim 18 wherein the cleaning plate includes mirrors attached to its surface, and wherein the method further comprises observing cleaning progress optically using the mirrors.

28. Method according to claim 27, wherein the optical observing is done via a video system of the mass spectrometer.

* * * * *